(12) United States Patent
Preston

(10) Patent No.: US 6,336,149 B1
(45) Date of Patent: Jan. 1, 2002

(54) MACRO RECORDING AND PLAYBACK DEVICE INDEPENDENT OF OPERATING SYSTEM OR APPLICATION SOFTWARE AND METHOD OF USING SAME

(76) Inventor: Glenn W. Preston, 18150 Camino de Estrellas, Rancho Santa Fe, CA (US) 92067

( * ) Notice: Subject to any disclaimer, the term of this patent is extended or adjusted under 35 U.S.C. 154(b) by 0 days.

(21) Appl. No.: 09/237,316

(22) Filed: Jan. 26, 1999

(51) Int. Cl.[7] .................................................. G06F 13/00
(52) U.S. Cl. ..................... 710/1; 710/5; 710/12
(58) Field of Search .............................. 710/1, 2, 5, 7–8, 710/20, 52, 65, 12, 15, 36, 46, 48

(56) References Cited

U.S. PATENT DOCUMENTS

| 5,028,768 A | * | 7/1991 | Kevorkian et al. ........... 235/449 |
| 5,065,360 A | * | 11/1991 | Kelly ........................... 395/800 |
| 5,157,384 A | * | 10/1992 | Greanias ...................... 340/706 |
| 5,335,342 A | * | 8/1994 | Pope et al. ................... 395/575 |
| 5,598,333 A | * | 1/1997 | Marisco, Jr. .................. 714/38 |
| 5,657,480 A | * | 8/1997 | Jacoson ........................ 395/555 |
| 5,797,795 A | * | 8/1998 | Takemoto et al. ............. 463/42 |
| 5,835,571 A | * | 11/1998 | Johnson ........................ 379/67 |
| 6,002,402 A | * | 12/1999 | Schacher ...................... 345/352 |
| 6,097,887 A | * | 8/2000 | Hardilkar et al. ............. 717/1 |

* cited by examiner

Primary Examiner—Thomas Lee
Assistant Examiner—Rijue Mai
(74) Attorney, Agent, or Firm—Foley & Lardner; Bernard L. Kleinke

(57) ABSTRACT

A macro recording and playback device has inputs for coupling to a plurality of computer input devices. The computer input devices provide a sequence of input messages for performing a repetitive function. In a record mode, a macro indicative of the sequence of input messages is stored in a memory, with an identifier associated with the macro. In a playback mode, the macro causes output messages to a computer device which are indicative of the serious of input messages. Thereby, playing the macro causes the computing device to perform the repetitive function. Further, a method is disclosed for receiving in a parallel manner a sequence of input messages from computer input devices, with the parallel messages forming a data word. The sequence of data words are stored, forming a macro. When the macro is selected and played, messages are sent to the computer device indicative of the received input messages.

20 Claims, 2 Drawing Sheets

MACRO RECORDING AND PLAYBACK DEVICE INDEPENDENT OF OPERATING SYSTEM OR APPLICATION SOFTWARE AND METHOD OF USING SAME

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The field of the present invention is electronic devices for connection to a computer device. More particularly, the present invention relates to an electronic device and method providing macro recording and playback functionality for a computing device.

2. Background Art

Computing devices are well-known in the art and widely used. For example, computer devices may take the form of a personal computer, a centralized computer with computer terminal access, or a widely distributed system with computing devices connected with a network such as the Internet. Although some computing devices may operate with little or no human intervention, many computing devices require human input to operate. Computing devices, such as the personal computer, typically have a keypad or keyboard for inputting numerical and textual information.

Depending on the type of work performed by the computing device the computing device may also have other types of inputs. For example, with the popularity of graphical user interfaces the use of graphic input devices has dramatically increased. Graphical input devices include devices such as a computer mouse, graphics tablets, digitizers, and light pens. These devices allow a graphical element such as a cursor to be moved and positioned on a computer screen. This graphical element may be used to select functional commands to direct the operation of the computer or may assist in the input of information.

One of the most popular graphical input devices is the mouse. The mouse connects to the computing device and is used to select commands and input graphical information. By moving the mouse across a surface, the mousers relative movements are communicated to the computing device, thereby moving the graphical cursor. Buttons on the mouse access and activate commands and also input graphical information by placing the cursor.

The mouse comes in several forms including one device that is rolled on top of a flat surface and another form commonly referred to as the track ball. The track ball is similar to the mouse in that it communicates relative movement conditions to the computer device. However, the movement is controlled by rotating a small ball, usually with the thumb.

Computing devices may also accept voice inputs from a user. The user speaks into a microphone where the sound waves of the voice are converted into electrical signals. The electrical signals are received into a voice control unit where the electrical signal is correlated to textual input or commands. Thereby, by voice a user may input text into the computing device or alternatively may command the computing device to take particular actions.

Computing devices also accept other inputs depending upon the particular application operating on the computing device. For example, some computing devices may need graphical inputs from digital cameras or from video recorders. Other computers may accept information from outside networks such as the Internet or may receive information via a modem connection.

When operating a computing device, the user interacts with the input devices to direct the operation of the computing device. Many times the computing device requires the same series of inputs to perform a particular operation. Performing this set of repetitive operations may include inputs from several input devices. For example, a particular operation may require a mouse action to initiate a program, waiting for a period of time, and then textually inputting an access password with the keyboard. Additional keyboard, mouse, or other inputs may then be needed to conclude the repetitive operation. Each time the user desires to perform this repetitive operation, the user must go through the same sequence using the several input devices. Not only is this time consuming but the sequence may be prone to errors. In some situations, repetitive operations may be simplified by the use of a macro.

Macros are used to automate repetitive keyboard and mouse inputs in a particular application. In general, macros are files containing repetitive instructions. Upon command the new macro may be replayed by the computing device. For example, applications, such as the Microsoft "Word" word processor, have macro recording and playback capabilities. For example, in Microsoft Word, the user may record a macro to perform a particular operation and give that operation a name. Thereafter, that operation may be performed by executing that named macro. In Microsoft Word, as is typical in many applications, the application has a utility for recording and naming the macro. To run the macro, the application has a macro playback facility which can be initiated by command or through the use of a shortcut command.

Further, the operating system, such as Microsoft Windows, may also have a macro recording capability. In a manner similar to that described above, the Windows' recorder allows the user to record repetitive keystrokes and mouse movements and store these inputs into a named file. Then, upon activating the playback utility, the playback utility plays back the series of mouse commands and keystrokes.

However, the macro recording and playback systems incorporated within an individual application or within the operating system have proven to be limited in their application and effectiveness. For example, an application-based macro recording and playback facility is only able to interact with the application in which it resides and is therefore not able to control or provide input for other applications or the operating system. Further, no capability is known for incorporating other input devices such as voice or digital image devices. The macro recording system of the operating system likewise is limited as the known operating system macro facilities are limited to mouse and keyboard inputs. Further, the operating system can only record keystrokes and mouse movements as interpreted by the operating system. For example, the operating system is not able to acquire and play back and therefore emulate the actual hardware input devices as the operating system can only record inputs as filtered through the computing device's operating system and device drivers.

For example, U.S. Pat. No. 5,157,384 provides an application operating on a computing device that accepts input from a variety of input devices and routes messages from these input devices to an alternative input subsystem. The alternative input subsystem then routes a single message into the operating system. At a later time the input messages may be edited or replayed. However, the macro recording facility of this patent is a software application operating on the computing device itself. Therefore, this macro facility suffers from the same limitations as described above.

In a similar manner U.S. Pat. No. 5,335,342 discloses an automated software testing system where input signals to the system under test are recorded by the testing system as a script. Later the script can be played back to the system under test. Thereby, errors in the software may be duplicated by duplicating the keystrokes and mouse movements prior to the occurrence of the software error. The script, however, records inputs only for one specific software application.

U.S. Pat. No. 5,598,333 has an apparatus and method for recording and playing back user input data. This apparatus and method, too, is designed for duplicating the occurrence of software defects in one specific software application.

Therefore, there exists a need for a flexible, easy to use macro and playback facility that controls and provides input to multiple applications. Further, there exists a need to provide this macro and playback facility with the capability of recording and identifying macro procedures.

SUMMARY OF THE INVENTION

It is therefore an object of the present invention to provide a macro recording and playback device capable of accepting and storing the input messages from a variety of computer input devices, independent of the application or operating system used on a target computing device.

Therefore, to overcome the disadvantages in the prior art and meet the objectives of the present invention, a novel macro recording and playback device and method is disclosed. A macro recording and playback device has inputs for coupling to a plurality of computer input devices. The computer input devices provide a sequence of input messages for performing a repetitive function. In a record mode, a macro indicative of the sequence of input messages is stored in a memory, with an identifier associated with the macro. In a playback mode, the macro causes output messages to a computer device which are indicative of the sequence of input messages. Thereby, playing the macro causes the computing device to perform the repetitive function. Further, a method is disclosed for receiving in a parallel manner a sequence of input messages from computer input devices, with the parallel messages forming a data word. The sequence of data words is stored, forming a macro. When the macro is selected and played, messages are sent to the computer device indicative of the received input messages.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
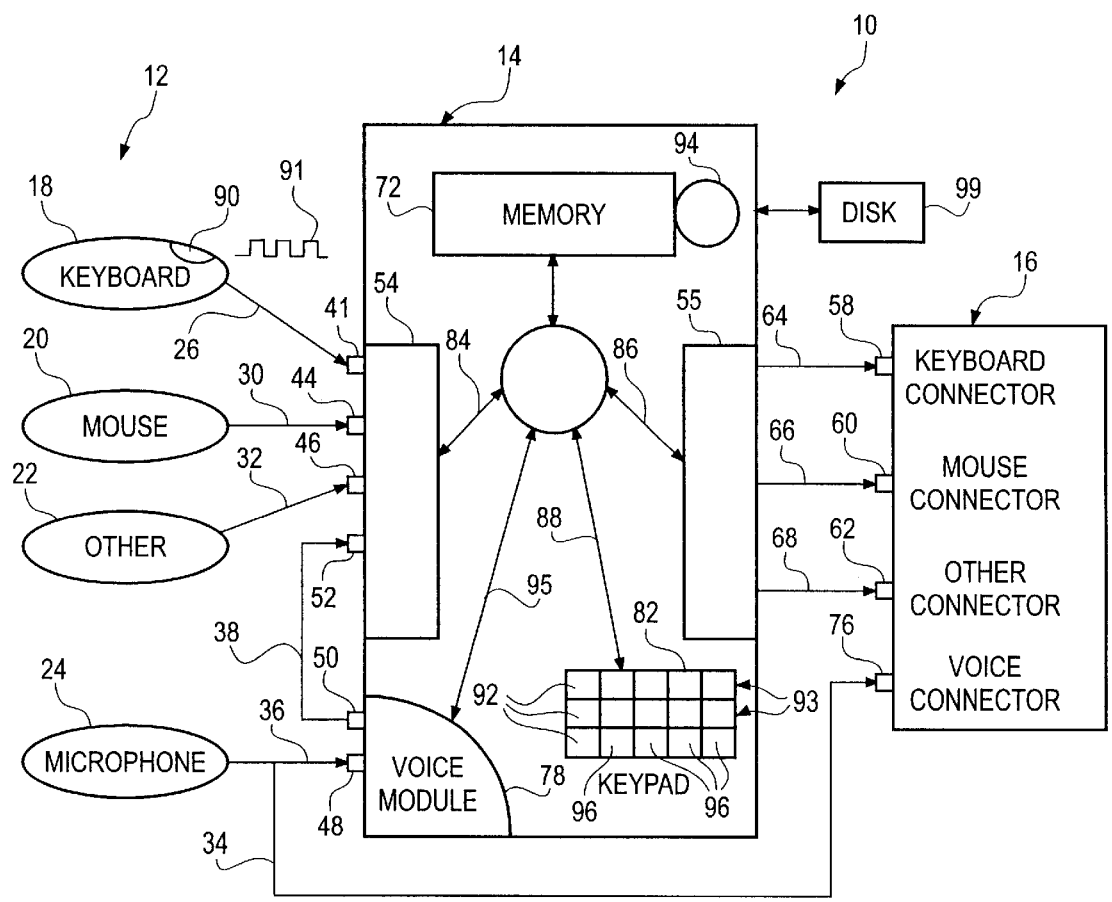
FIG. 1 shows a block diagram of a macro recording playback system constructed in accordance with the present invention.

FIG. 1 shows a macro recording and playback system 10 made in accordance with the present invention. The macro recording and playback system 10 has a macro device 14 operably positioned between compute input devices 12 and a computer 16.

The macro device 14 couples to computer input devices 12. When the macro device 14 is configured to be in a record mode, messages generated from the input devices 12 are accepted at the input area 54 of the macro device 14 and stored as a macro in memory 72. Thereby a sequence of inputs from the input devices 12 are recorded for playback at a later time. Each recorded macro has an identifier key 93 which corresponds to each recorded macro. When a specific macro identifier key 93 is selected and the macro device 14 is configured to be in a playback mode, the identified macro causes the output area 55 of the macro device 14 to send appropriate messages to the computer 16. By using the macro device 14, macros are recorded having inputs from different types of computer input devices 12. Further, since the macro device 14 is not under the control of the operating system on the computing device 16, the macros in the macro device 14 are recorded and played back entirely independent of the application and operating system functioning on the computer 16. The macro recording and playback system 10 will be addressed in more detail below.

The computer 16 may be any computing device configured to accept inputs from a user. Preferably, the computing device 16 is a personal computer such as the well-known IBM compatible personal computer. In such a case, the computing device 16 accepts input from several input sources. For example, the computer 16 may accept inputs at a keyboard connector 58. The keyboard connector 58 may accept textual, numerical, or operational commands from a keyboard or key pad. Further, the computer 16 may have a mouse connector 60. The mouse connector allows the computer 16 to accept the relative movement information from a graphical input device. Such graphical devices include the well-known mouse, track balls, light pens, graphics tablets, digitizers, or other such graphic input devices. The computer 16 may also accept voice data at a connector 76. The computer 16 accepts voice information and may interpret the voice data as commands as alpha-numeric input. Additionally, the computer 16 may have other connector 62 for connection to other devices such as digital cameras, VCRs, or network connections, for example.

Computer input devices, as discussed above, include the keyboard 18 or key pad, the mouse 20 or other graphical input device, a microphone 24, or other input devices 22. The keyboard 18 has a keyboard input line 26 configured to couple with the keyboard connector 58. In a similar manner, the mouse 20 has a mouse input line 30 configured to couple with the mouse connector 60. The microphone 24 has a microphone input line 34 configured to couple with the voice connector 76, and other input devices 22 have other input lines 32 configured for coupling with the other connectors 62. Thereby, the keyboard, mouse, microphone and other input devices are configured to directly connect to the computer 16 using standard connector and coupling techniques. These connector and coupling techniques are well known in the art.

The macro device 14 has an input area 54 which has couplers for connecting to the input devices 12. Thereby, the input area 54 has a keyboard connector 41 for coupling to the keyboard via the control keyboard line 28, the mouse couples to the mouse connector 44 via the mouse input line 30, and the other devices 22 connect via the other input lines 32 to the other connectors 46. Thus, connector 41 is like connector 58, connector 44 is like connector 60 and connectors 46 are like connectors 62. In such a manner, the standard keyboard, mouse, and other input devices may be readily coupled to the macro device 14.

Further, a microphone 24 coupled to a microphone connector 48 via control microphone line 36. The microphone connector 48 is like voice connector 76.

The keyboard may be used to command the macro device 14. Thereby, commands may be entered at the keyboard 18 and accepted by the macro device 14 for adjusting operational modes or instructing a particular function within the macro device 14. Although a keypad may be incorporated in the macro device for control, the use of the keyboard may augment the use of the keypad. For example, a simple keypad may not have a full alpha keyboard. With use of the keyboard 18, it may be possible to more easily name and select macros by a name.

In a similar manner the microphone 24 may provide a voice single to the microphone connector 48 via the control microphone line 36. The voice single is accepted by a voice control module 78 where the voice control module 78 decodes the voice signals into text and determines if the voice data should be directed to the macro device 14 or to the input area 54. If the voice control module 78 determines the voice data coming from the microphone 24 is intended as an input to the computer 16, then the voice data is routed from the voice control module 78 through microphone connector 50 to microphone connector 52 via microphone line 38. In such a manner, decoded voice data coming from microphone 24 may be accepted at the input area 54 of the macro device 14. However, if the voice control module 78 determines the voice data coming from microphone 24 is intended for the macro device 14, then the voice data is not forwarded to the input area 54 but is interpreted by the voice control module 78. In such a manner, the microphone data may be used to direct the functionality of the macro device 14, for example, by instructing the macro device 14 to change modes or playback a specific macro.

The macro device 14 also has an output area 55. The output area 55 has connectors and cables to provide connection with the computer 16. For example, the output area 55 has a keyboard line 64 configured to couple with keyboard connector 58. In a similar manner output area 55 has a mouse line 66 configured to couple with mouse connector 60. Further, the output area 55 has other output lines 68 configured to mate with the other connector 60.

The macro device 14 is thereby configured to accept inputs from standard computer input devices 12 and provide outputs to the standard connectors on computer 16. However, some modification of the standard inputs may be necessary.

For example, the line coming from microphone 24 may also be split to provide an input 48 to the voice control and a microphone line 34 which directly connects to voice connector 76 at the computer 16.

Turning now to discuss the functionality of the macro device 14. As described above, the macro device 14 has an input area 54 for connecting to computer input devices 12 and a output area 55 for coupling to standard computer connectors on the computer 16. Further, the macro device 14 has a micro processor 70 which accepts messages from the input area 54 via processor input line 84. The micro processor controller sends messages to the output area 55 via processor output line 86. The micro processor 70 also couples to memory 72 via memory line 87. The memory may be a random access memory of a size sufficient to hold and store macros. The memory 72 preferably is sustainable during periods when power is not applied to the macro device 14. This may be accomplished using a battery 94 coupled to the memory 72 for refreshing the memory 72. The use of battery backup 94 to refresh random access memory is well known in the art. Also, those skilled in the art will recognize that other controller means may be used, such as gate array device or PLD circuits.

A key pad 82 also connects to the processor 70 via a key pad line 88. The preferred key pad 82 has both macro identifier keys 93 and mode selection keys 92. Thereby a user selects a mode for the macro device 14 by selecting one of the mode selection keys 92. In a similar manner a user selects an individual key selected from the macro identifier keys 93 to associate with a particular macro.

The voice control module 78 also couples to the micro processor 70 via the voice recognition line 95. The voice control module 78 may contain its own micro processor for performing voice recognition functions or may use the micro processor 70 for such functionality. Preferably, the voice control module 78 has a separate micro processor for performing voice recognition and parsing the voice data into commands for the macro device 14 or input to the computer 16. In such a manner, if voice data is determined to be input for the computer 16, that input may be routed from microphone connector 50 through the microphone line 38 to microphone connector 52.

The macro device 14 operates in a mode selected by the user. The user places the macro device 14 in a particular mode by selecting one of the mode selection keys 92 from the key pad 82. The macro device 14 may be placed in one of three modes: (1) a pass-through mode where messages received from the input devices 12 are passed through the macro device 14 and received at computer 16; (2) a record mode where the messages received from the input devices 12 are recorded as a macro and stored in memory 72; and (3) a playback mode where the user selects a particular macro and the computer 16 receives messages as indicated in the macro.

When the macro device 14 is in record mode, the macro device 14 also operates to pass the commands from the input devices 12 to the computer device 16. Thereby the user's actions on the input devices 12 are both recorded and stored as a macro in memory 72 and used to direct immediately the operations of the computer 16.

In use, a user first couples the macro device 14 into the macro system 10. The user attaches the input devices 12 such as keyboard 18, mouse 20, microphone 24 and any other input devices 22 to the inputs of the macro device 14. The macro device 14 is then coupled to the keyboard, mouse, voice, and other connectors on computer 16. As discussed above, the user may supply cabling devices to split the microphone line. Once connected, the computer 16 and the macro device 14 are activated. The macro device 14 may be powered by drawing power from the computer 16 through the keyboard line 64. However, preferably the macro device 14 has an independent power supply coupled to an external power source.

With power applied, the macro device 14 defaults initially to be in the pass-through mode. Thereby, the user uses the computer input devices 12 without regard to the presence of the macro device 14. For example, as the computer 16 is booted, the computer may require various passwords and logging information from the user. The user responds to these requests for input using the computer input devices 12 with the information input on the computer devices 12 immediately passed through to the computer 16.

At any time the user may change modes for the macro device 14 by depressing one of the mode selection keys 92. For example, when the macro device 14 is first activated, previously stored macros may still be present in the dynamically refreshed memory 72. The presence of these macros in memory may be indicated by having one or more macro identifier keys 93 illuminated with a light. In such a manner, each of the macro identifier keys 93 presently associated with a stored macro would be lit. Thereby, the user clearly sees that the memory already has one or more macros stored.

To operate one of the stored macros, the user places the macro device 14 in a playback mode by selecting the appropriate mode selection key 92. The user then selects one of the lit macro identifier keys 93 corresponding to the appropriate macro. The macro device 14 then causes the stored macro to play back with the appropriate instructions and information being sent to the various connectors on the computer 16. Those skilled in the art will recognize that other methods exists for identifying and selecting stored macros. For example, a keyboard and small LCD display may be used to associate a name with each macro and the selection of that name used to activate the macro.

To record a macro, the user uses the appropriate mode selection key 92 to place the macro device 14 in a record mode. The user then selects an unused identifier for associating with the new macro. For example, the user may chose an unlit one of the macro identifier keys 93 for associating with the new macro. Thereby, the user first selects a macro identifier key before using the computer input devices 12. The macro identifier key 93 selected by the user may indicate a recording function for example by intermittently flashing its internal light. Thereby, the user is aware the macro device 14 is in a record mode because the selected macro identifier key 93 is flashing.

The user then uses the computer input devices 12 to perform a particular operation on the computer 16. As the messages from the computer input devices 12 are passed through to the computer 16, the computer 16 responds as expected to the inputs as supplied by the user. However, the messages received from the computer input devices 12 are simultaneously accepted into the input area 54, processed by the processor 70 and stored into memory 72. Once the computer operation is complete and the user desires to stop recording the macro, the user once again depresses the flashing macro identifier key 93. With the macro now recorded and associated with a particular macro identification key 93, that macro identification key 93 will have its light steadily on.

The key pad 82 of the macro device 14 also has control keys 96 for effecting various operations on the macro device 14. For example, one of the control keys 96 permits a selected macro to be deleted from memory. For example, while in record mode, the user selects a macro identifier key 93 already associated with a macro. By depressing the control key 96 associated with clearing macros, the stored macro is deleted from association with the macro identifier key 93. After deletion, the light is turned off for that particular macro identifier key 93. Another of the control keys 96 permits pausing during both the recording and the playback functions. Thereby, the user may manually effectuate a pause during the playback mode or may interrupt the recording of a macro. In using the pause key the user selects the pause key a first time to start a pause and presses the pause key a second time to resume normal recording or playback. Those skilled in the art will recognize that other control keys may be added to provide additional functionality for the macro device 14.

Although the preferred macro device 14 has a key pad 82, those skilled in the art will recognize other methods exists for controlling the macro device 14. These alternative devices may either replace the key pad 82 or may be used to augment its functionality. For example, the keyboard 18 may provide a command input to the micro processor 70 via keyboard control line 97. Thereby, central information received at the micro processor 70 may be commands to the micro device 14.

For example, the processor 70 may be configured to understand that any information received from the keyboard beginning with "!!" will be interpreted as a macro device 14 command. For example, if a user types in "!! record" followed by a carriage return, the macro processor will recognize that the word "record" is a command to place the macro device 14 into its record mode. Other text and commands not preceded with the "!!" will be understood to be data for sending to the computer 16. Thereby, the keyboard 18 may augment or replace the key pad 82 for controlling the macro device 14.

In a similar manner the microphone 24 provides voice data to the voice control module 78. The voice control module 78 may be configured to screen for particular words or phrases that identify a command to the macro device 14. For example, the voice control module 78 may understand the single word command "macrocommand" to indicate that the next word will be a command to the macro device. For example, the user may say "macrocommand record." Thereby, the voice control module 78 will know that the word following "macrocommand" is a command. When the voice control module 78 interrupts that the following word is "record," such command will be indicated to the micro processor 70 via voice recognition line 95. Thereby, the microphone may be used to augment or even replace the functionality of the key pad 82.

The macro device 14 is seamlessly positioned between the input devices 12 and the computer 16. Use of the macro device 14 requires no change of any kind to the computer or the input devices. Indeed, use of the macro device 14 requires nothing more than making cable connections using standard cables and connectors.

Figure 2:
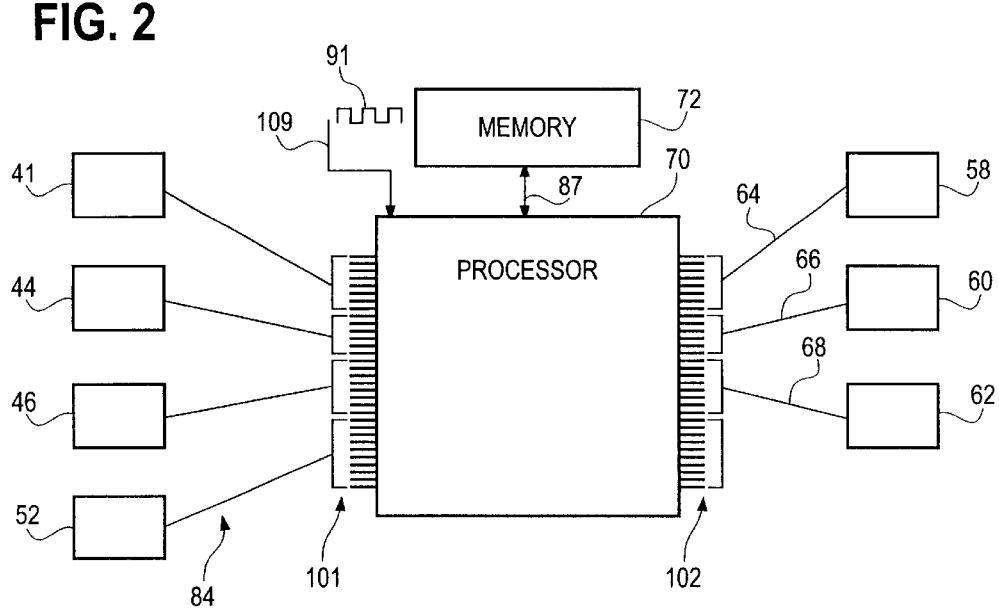
FIG. 2 shows a block diagram of the micro-processor for the macro device constructed in accordance with the present invention.

Referring now to FIG. 2 the operation of the micro processor is discussed in more detail. In FIG. 2, the micro processor 70 is shown connected to the keyboard connector 41, the mouse connector 44, the other connector 46 and the microphone connector 52. These connectors coupled to the processor input pins 101 via the processor input line 84. Thereby, each input device 12 provides a parallel connection to the input pins 101 of the micro processor 70.

In a similar manner the keyboard connector 58, the mouse connector 60, and the other connector 62 are connected in parallel to the micro processor output pins 102. Thereby, the micro processor is connected to each connector on the computer 16 with a parallel connection. If a particular input device is serial in nature, then the micro processor will couple to such a device a single bit at a time.

Figure 3:
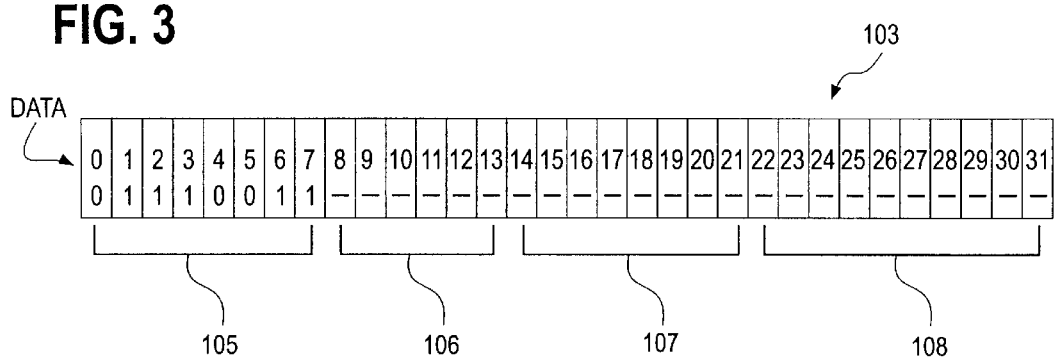
FIG. 3 shows a diagram of a data word for use in the micro processor of the macro device made in accordance with the present invention.

The micro processor operates a program which may be stored in permanent memory or reloaded from a permanent memory before each use. This program permits the micro processor to operate the macro device 14 in either a pass-through mode, a record mode, or a playback mode. In the pass-through mode, the micro processor accepts clock inputs 91 on clock input 109. The clock input 109 may be provided from several sources, including, for example, the internal clock 90 from the keyboard. Each time a clock cycle is detected from clock input line 109, the micro processor is directed to read the status of the input pins 101. Thereby, at each clock cycle the micro processor receives a data word equal in length to the number of input pins 101. For example, each time micro processor 70 reads the status of input lines 101, data word 103 is captured. As shown in FIG. 3, data word 103 is 32 bits long corresponding to the 32 pins of input pins 101. Those skilled in the art will recognize that the number of input pins is dependent on the selected processor with either more or fewer input pins available depending upon which processor is used.

FIG. 3 shows that the keyboard connector 41 provides an eight bit parallel input corresponding to the first eight bits of the data word 103. These first eight bits are indicated as keyboard data 105. In a similar manner input from the mouse connector 44 is identified as mouse data 106. Further, other data 103 and voice data 108 are shown on the data word 103. Those skilled in the art will recognize that the specific configuration of the data word 103 will change depending upon the types of inputs provided on the macro device 14.

Specifically, FIG. 3 shows that at a particular clock cycle, the keyboard data 105 consisted of "01110011." The mouse data 106, other data 107, and voice data 108 did not contain any information as indicated by the "-" symbols. If the micro processor is acting in pass-through mode, then the micro processor directs that the data word 103 be immediately routed to the output pins 102. Thereby the data received on the input pins 101 is present on the output pins 102 within only a few internal clock cycles of the micro processor 70.

If the micro processor is placed in a record mode, the data word 103 is immediately passed to the output pins 102 as if in pass-through mode. Further, the data word 103 is directed through the memory lines 87 to be stored in memory 72. Thereby, for each clock cycle received on clock line 109, a data word 103 is received on input pins 101 and passed to output pins 102 and substantially simultaneously stored into sequential memory addresses of memory 72. Thereby, the memory 72 has sequentially stored the input messages as received from the input devices 12.

As expressed earlier, each macro recorded by the micro processor 70 is identified by a macro identifier such as an illuminated key. When the micro processor 70 is placed in a playback mode, and a particular macro selected with the identifier, the contents of the memory is sequentially output onto output pins 102. Thereby, the information present at output pins 102 reflects the input messages as recorded from input pins 101. The size and width of the memory 72 determines the length and number of macros which may be recorded. For example, by adding wider and more memory, longer or additional macros may be recorded.

Further, those skilled in the art will recognize that other methods exists for recording the input messages into memory as a macro. For example, a compression algorithm may be performed on the data words 103 before storage in the memory 72. Thereby, the storage dedicated to each individual macro may be significantly reduced. Also, those skilled in the art will recognize that the clock signal may be obtained through other sources. Further, the rate of the clock signal may be selected to accommodate different computer input devices. For example, the use of graphical devices may require a higher check sampling rate than if only keyboard and name inputs are used.

The micro processor 70 is also responsible for controlling the macro device 14, including tracking the macro identifiers and associating the macro identifiers with a particular range in memory 72. Thus, for example, the micro processor 70 would assign a particular macro identifier key to begin at a particular address and then store data words sequentially in memory locations after that address to store a particular macro. Memory management for micro processors is well known in the art.

Referring again to FIG. 1 the macro device 14 is shown with a disk drive 99. The disk drive 99 may be used to store macros for use in the macro device 14. The disk drive 99 may be a permanent hard disk for holding large or multiple macros. Preferably disk drive 99 is a standard floppy disk so that macros may be transferred to and from the macro device 14. For example, a software manufacturer may provide macros with its software package which may be loaded into the memory 72 of the macro device 14. Further, the floppy disk 99 might be used to update the program operating on micro processor 70. The process of updating programs held in programmable memory is well known in the art.

Figure 4:
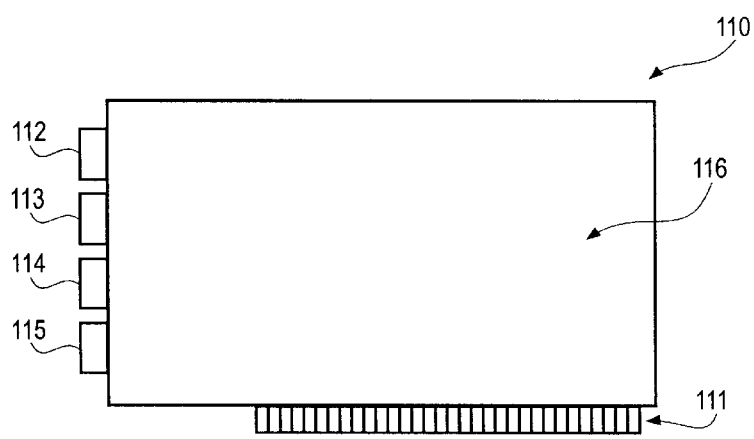
FIG. 4 shows a diagram of a macro board made in accordance with the present invention.

Although the macro device 14 discussed thus far envisions a physical stand alone box positioned between the input devices 12 and the computer 16, the invention is not to be so limited. For example, the micro device may be a macro board 110 for insertion into the standard back plane of a computing device as shown in FIG. 4. In such a manner, the macro computer board 110 would accept input from standard computer input devices.

For example, the macro board 110 may have a standard keyboard connector 112, a standard mouse connector 113, other input connector 114, and voice connector 115. If the macro board 110 does not physically have sufficient space for desired input connectors, an external support housing may be used to house the connection, and a cable used to couple the support to the macro board 110. The microprocessor, memory, and additional circuitry for the macro board 110 may be positioned on the board surface 116.

In use, the macro board 110 routes input messages directly onto the computer back plane through card connector 111, thus bypassing the standard computer input connectors. In this manner the macro board connection to the back plane becomes the output area where the input messages are communicated to the computer. As understood in the art, the messages output to the computer backplane may require additional processing not required for the stand alone macro device 14 discussed above. Since the macro board 110 is likely not to have its own key pad control, mode selection and macro selection would be performed at the keyboard or through a voice recognition as discussed above. However, a keypad may be coupled to the macro board by adding a keypad connector to the board.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A macro recording and playback system for use with a computer means, the computer means having a plurality of input devices, comprising:

controller means having input means and output means;

input connection means for coupling the plurality of input devices to said input means, the input means accepting a sequence of input messages from the plurality of input devices;

output connection means for coupling the computer means to said output means;

mode selection means for selecting a mode, the mode being a record mode, a pass-through mode, or a playback mode;

clock means providing a clocking signal for said controller;

a memory means;

wherein when in pass-through mode or record mode, responsive to said clocking signal the controller causes sampling of the input means, the sampled input being passed through to said output means for outputting signals indicative of said input message to the computer means;

wherein when in record mode, the controller causes macro messages indicative of the sampled input to be stored in said memory as a macro; and wherein when in playback mode, the controller causes said output means to output signals indicative of the macro messages.

2. The macro recording and playback system of claim 1 further including macro identification means for associating a macro with an identifier.

3. The macro recording and playback system of claim 1 further including a keypad for providing macro identifier means and command input means.

4. The macro recording and playback system of claim 1 wherein the system is housed remotely from the computer means.

5. The macro recording and playback system of claim 1 wherein the system is housed integrally with the computer means.

6. A macro recording and playback system for use with a computer means, the computer means having a plurality of input devices, comprising:

input means responsive to the plurality of input devices for accepting a sequence of input messages from the plurality of input devices, the sequence of input messages for performing a repetitive function;

a macro board connected to the input means, the macro board comprising:

output means coupling to the computer device for sending output messages to the computer means;

mode selection means for placing the macro system in a selected mode, the selected mode being a record mode, a pass-through mode, or a playback mode;

memory means for storing a macro indicative of the sequence of input messages;

macro identification means for associating the macro with an identifier;

controller means operably coupled to said input means, said output means, and said memory means for causing when in record mode, a macro to be stored in said memory means;

when in pass-through mode, the output messages to be indicative of the input messages; and when in playback mode and the identifier selected, the output messages to be indicative of the series of stored input messages.

7. The macro recording and playback system according to claim 6 wherein the input means includes a plurality of input connectors with each connector corresponding to a standard computer input connector for mating with a computer input device.

8. The macro recording and playback system according to claim 6 wherein the input means includes a keyboard connector and a mouse connector.

9. The macro recording and playback system according to claim 6 wherein the output means has a plurality of output lines terminating in a standard computer input device connector.

10. The macro recording and playback system according to claim 6 where the output means couples to the back plane of a computer.

11. The macro recording and playback system according to claim 6 further comprising a keypad for mode selection and macro identification.

12. The macro recording and playback system according to claim 6 wherein macros are identified by illuminating keys on a keypad.

13. The macro recording and playback system according to claim 6 where a computer keyboard provides commands.

14. The macro recording and playback system according to claim 6 further including a voice control module for receiving voice commands from a microphone.

15. The macro recording and playback device according to claim 6 further including a voice control module for receiving voice data and providing an input message indicative of the voice date to the input means.

16. The macro recording and playback device according to claim 6 where the control means receives the input messages in a parallel configuration.

17. The macro recording and playback device according to claim 6 where in record mode the output messages are also indicative of the input messages.

18. A method for recording and playing a macro on a macro recording and playback system having controller means for use with a computer means, the computer means having a plurality of input devices, the method performed by the controller means comprising the steps of:

placing the macro recording and playback system in a pass-through mode, a record mode, or a playback mode;

receiving at an input means a sequence of input messages from the plurality of input devices, the sequence of input messages for performing a repetitive function;

sending, when in pass-through mode or record mode, the sequence of input messages to the computer means;

storing, when in record mode, a macro indicative of the sequence of input messages;

associating an identifier with the macro, the macro recording and playback system configured to identify a plurality of macros;

selecting the identifier and placing the macro recording and playback system in playback mode; and outputting the sequence of input messages to the computer means.

19. The method for recording and playing a macro according to claim 18 wherein the sequence of input messages is sampled at a rate responsive to a clocking signal.

20. The method for recording and playing a macro according to claim 18 further including illuminating an identifier key on a keypad for identifying the macro.

* * * * *